US010187914B2

(12) United States Patent
Wallentin et al.

(10) Patent No.: US 10,187,914 B2
(45) Date of Patent: Jan. 22, 2019

(54) ESTABLISHMENT OF A WIRELESS BACKHAUL CONNECTION FROM A SMALL CELL RBS

(71) Applicant: TELEFONAKTIEBOLAGET LM ERICSSON (PUBL), Stockholm (SE)

(72) Inventors: Pontus Wallentin, Linköping (SE); Zere Ghebretensaé, Trångsund (SE); Kim Laraqui, Solna (SE); Ioanna Pappa, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 15/127,833

(22) PCT Filed: Mar. 26, 2014

(86) PCT No.: PCT/EP2014/056084
§ 371 (c)(1),
(2) Date: Sep. 21, 2016

(87) PCT Pub. No.: WO2015/144218
PCT Pub. Date: Oct. 1, 2015

(65) Prior Publication Data
US 2017/0099685 A1 Apr. 6, 2017

(51) Int. Cl.
H04W 4/00 (2018.01)
H04W 76/10 (2018.01)
(Continued)

(52) U.S. Cl.
CPC ........... *H04W 76/10* (2018.02); *H04W 24/02* (2013.01); *H04W 48/16* (2013.01);
(Continued)

(58) Field of Classification Search
CPC combination set(s) only.
See application file for complete search history.

(56) References Cited

U.S. PATENT DOCUMENTS 9,521,549 B2 * 12/2016 Lundstrom ............. H04W 8/26
9,672,527 B2 *  6/2017 M ....................... H04W 76/022
(Continued)

FOREIGN PATENT DOCUMENTS

EP    2 369 893 A1    9/2011

OTHER PUBLICATIONS

Kreitmair, Self-Configuration in LTE Self Organizing Networks, Seminars FI / IITM / ACN SS2013, Network Architectures and Services, 6 pages, Aug. 2013.*
(Continued)

*Primary Examiner* — Frank Duong

(57) ABSTRACT

The present disclosure relates to devices and methods for establishing and maintaining backhaul connections between small cell radio base stations and a core network. In particular it relates to methods using a client to manage the backhaul connection. According to one aspect, the method relates to receiving, from the small cell RBS, at least one message triggering the establishment of the wireless backhaul connection between the small cell RBS and the core network. The method further comprises deriving, from the at least one message, base station property information of the small cell RBS. The method further comprises sending, to a core network node, a connectivity request message, including the derived base station property information thereby enabling a selection of a packet gateway and/or a configuration for the small cell RBS in the establishment of the wireless backhaul connection. The disclosure also relates to a method performed in a core network node and to a corresponding client and core network node.

23 Claims, 6 Drawing Sheets

(51) Int. Cl.
*H04W 24/02* (2009.01)
*H04W 48/16* (2009.01)
H04L 29/12 (2006.01)
H04W 88/16 (2009.01)
H04W 92/04 (2009.01)

(52) U.S. Cl.
CPC ......... *H04L 61/6086* (2013.01); *H04W 88/16* (2013.01); *H04W 92/045* (2013.01)

(56) References Cited

U.S. PATENT DOCUMENTS

2009/0310584 A1    12/2009  Viorel et al.
2013/0301520 A1*   11/2013  Aminaka .............. H04W 36/08
                                                370/315

OTHER PUBLICATIONS

Peter Szilagyi et al. Multi-Vendor Auto-Connectivity in Heterogeneous Networks. Integrated Network Management (IM 2013). 2013 I FI P/I EEE International Symposium on. IEEE. May 27, 2013 (May 27, 2013).

Peter Szilagyi et al. LTE relay node self-configuration. Integrated Network Management (IM). 2011. IFIP/IEEE International Symposium on. IEEE. May 23, 2011 (May 23, 2011).

Henning San Neck et al. Auto-Connectivity and Security Setup for Access Network Elements. Integrated Network Management. 2009. IM '09. IFIP/IEEE International Symposium on. IEEE. Piscataway. NJ. USA. Jun. 1, 2009 (Jun. 1, 2009).

* cited by examiner

ESTABLISHMENT OF A WIRELESS BACKHAUL CONNECTION FROM A SMALL CELL RBS

TECHNICAL FIELD

The present disclosure relates to devices and methods for establishing and maintaining backhaul connections between small cell radio base stations and a core network. In particular it relates to methods using a client to manage the backhaul connection.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. The E-UTRAN consists of base stations called enhanced NodeB (eNB or eNodeB), providing the E-UTRAN user plane and control plane protocol terminations towards the user entities, UE.

Cellular service providers manage their networks for example by splitting cells with multiple base stations or adding additional base stations when the network is heavily loaded. In a heterogeneous network (HetNet) cellular deployment, typically small cells, e.g. picocells, served by pico radio base stations, pRBS, are added in order to off-load the macro cells and to increase coverage. The small cells are especially needed in urban environments, where there are many users and buildings which limit coverage.

For small cell deployments in dense urban environments wireless, Mobile Backhaul, MBH, Non/Near Line-Of-Sight, NLOS, solutions are expected to be predominant. These solutions will be implemented by means of wireless links, connecting the small cell RBS to hubs. In locations where several small cell RBS are needed it is possible that they will be Daisy-chained.

FIG. 1 illustrates the existing technologies. A User Equipment 10, UE, e.g. a mobile/cellular phone, is using a Radio Access Network, RAN, service to access the mobile network services. The radio link 6 is provided by a pRBS. A given pRBS may provide one or a combination of several radio access technologies over the radio link, e.g. 3GPP LTE, 3GPP HSPA, 3GPP GSM or IEEE 802.11x i.e. WiFi. The pRBS needs to backhaul the RAN traffic to the mobile network, and uses an NLOS link 5 for this.

The NLOS link 5 is implemented by means of two terminals on either side of this link, terminal A 1 and B 7. On the Hub side, traffic terminated on terminal B is forwarded to the core network via e.g. a fixed link over copper or fiber media. Terminal A will typically be implemented by using a UE embedded into the pRBS. This UE is referred to as a client. On the Hub side, terminal B will act as an RBS.

Since some of the advantages with LTE are that it offers fast data rate transfer and that it offers fast data transfer in a spectrum-efficient way, including point-to-multipoint connections, it could be desirable to realize the NLOS link 5 with LTE. However, some problems with the existing technology arise when trying to realize the NLOS link with LTE or any other Internet Protocol (IP) based technology; for example, how to establish a backhaul connection and how to find a suitable packet data network gateway, PDN-GW. Hence, there is a need for methods enabling the use of IP based technology in the NLOS link.

SUMMARY

An object of the present disclosure is to provide devices and methods for assisting network management which seeks to mitigate, alleviate, or eliminate one or more of the above-identified deficiencies in the art and disadvantages singly or in any combination.

The present disclosure presents methods and devices to realize the NLOS link with an IP based technology, such as LTE.

The solution proposes that a small cell RBS triggers a client to establish a wireless backhaul connection between the small cell RBS and a core network. It also addresses how the small cell RBS is assigned a suitable IP configuration, including IP address, gateway node and bearer configuration via the wireless backhaul client.

The proposed technique relates to a method performed in a client, configured to wirelessly connect at least one small cell RBS to a core network, of establishing one wireless backhaul connection between one small cell RBS and the core network.

By performing the method in the client, a convenient way to connect new small cell RBS to a core network is provided; the client will handle the setup of the backhaul connection. Furthermore, by using a client for establishing and maintaining the backhaul connection, there is no need to make changes in existing RBS technology for using IP based technology over the NLOS link.

According to one aspect, the method comprises receiving, from the small cell RBS, at least one message triggering the establishment of the wireless backhaul connection between the small cell RBS and the core network. The method further comprises deriving, from the at least one message, base station property information of the small cell RBS. The method further comprises sending, to a core network node, a connectivity request message, including the derived base station property information thereby enabling a selection of a packet gateway and/or a configuration for the small cell RBS in the establishment of the wireless backhaul connection.

The client derives base station property information from the triggering message to ensure that the backhaul connection is effective. The disclosure provides a clear and straightforward way to trigger the establishment of a backhaul connection and provide IP address to the small cell RBS. The disclosure further provides a streamlined approach to the various parts of a backhaul connection establishment which is a fundamental part of small cell RBS integration.

According to one aspect, the step of sending further comprises sending the connectivity request message over a first frequency band. The first frequency band being distinct from a second frequency band in which the small cell RBS communicates with wireless devices.

According to one aspect, the step of sending further comprises sending the connectivity request message over a first radio access technology, the first radio access technology being distinct from a second radio access technology over which the small cell RBS communicates with wireless devices. In other words, the client communicates with the core network over one radio access technology and the small cell RBS communicates with UE over another.

According to one aspect, the message triggering the establishment of the wireless backhaul connection is a DHCPDISCOVER Dynamic Host Configuration Protocol version 4, DHCPv4, message. There is no need for any other specific connection messages when using a DHCP message to trigger the backhaul connection establishment. DHCP is also used for regular eNB so it is available and the specific option utilized is vendor specific. Thus an elegant solution to backhaul connection establishment is offered with no changes or additions required.

According to one aspect, the base station property information is derived from the Vendor Class Identifier, VCI. According to one aspect the VCI comprises the Access Point Name, APN. According to one aspect, the VCI is an extension which is present in the DHCPDISCOVER message.

According to one aspect, the message triggering the establishment of the wireless backhaul connection is a Solicit Dynamic Host Configuration Protocol version 6, DHCPv6, message.

According to one aspect, the base station property information is derived from a DHCP Unique Identifier, DUID. The DUID is present in the Solicit message.

According to one aspect, the method further comprises the step of establishing a wireless backhaul connection between the small cell RBS and a packet data network gateway selected by the core network node.

According to one aspect, the step of establishing a wireless backhaul connection further comprises receiving a connectivity accept message from the core network node.

According to one aspect, the step of establishing a wireless backhaul connection further comprises sending a connectivity complete message to the core network node.

According to one aspect, the connectivity accept message comprises an Internet Protocol, IP, address assigned to the small cell RBS, and wherein the method further comprises providing the assigned IP address to the small cell RBS.

According to one aspect, the base station property information is derived from a destination address in the message, wherein the message is an IP packet, Address Resolution Protocol, ARP, packet or an Internet Control Message Protocol, ICMP, packet.

According to one aspect, the base station property information is derived from a source address in the message, wherein the message is an IP packet, Address Resolution Protocol, ARP, packet or an Internet Control Message Protocol, ICMP, packet.

According to one aspect, the base station property information is derived from an interface identifier, and wherein the message is a Neighbor Discovery Protocol, NDP, message.

According to one aspect, the base station property information comprises an Access Point Name, APN.

According to one aspect, the base station property information indicates the radio access technology of the small cell RBS.

According to one aspect, the base station property information identifies type of RBS equipment of the small cell RBS.

According to one aspect, the small cell RBS is a pico-evolved Node B, pico-eNB, wherein the packet data network gateway is an Evolved Packet Data Network Gateway, E-PDN-GW and wherein the configuration is Evolved Packet System, EPS, bearer configuration.

According to another aspect, the disclosure relates to a method, performed in a core network node, of establishing a wireless backhaul connection with a small cell RBS. The method comprises receiving from a client, a connectivity request message including base station property information, wherein the client has derived the property information from the small cell RBS. The method further comprises selecting a packet data network gateway and/or a configuration for the small cell RBS based on the received base station property information. The method further comprises establishing a wireless backhaul connection between the small cell RBS and the selected packet data network gateway using the selected configuration.

According to one aspect, the step of establishing a wireless backhaul connection further comprises sending a connectivity accept message to the client.

According to one aspect, the connectivity accept message comprises an IP address.

According to another aspect, the disclosure relates to a client, configured to wirelessly connect at least one small cell RBS to a core network. The client comprises a communication interface, for communication with at least one small cell RBS, a radio communication interface, for communication with a core network, and processing circuitry. The processing circuitry is configured to cause the client to receive, using the communication interface, from a small cell RBS, at least one message triggering the establishment of the wireless backhaul connection between the small cell RBS and the core network;

to derive, from the at least one message, base station property information of the small cell RBS; and to send, using the radio communication interface, a connectivity request message, including the derived base station property information, to a core network node, thereby enabling selection of packet data network gateway and/or a configuration for the small cell RBS.

According to another aspect, the disclosure relates to a core network node configured to establish a wireless backhaul connection with a small cell RBS. The network node comprises a communication interface configured for communication with client, configured to wirelessly connect at least one small cell RBS to a core network and processing circuitry. The processing circuitry is configured to cause the core network node:

to receive from a client, using the communication interface, a connectivity request message including base station property information derived in the client from the small cell RBS, to select a packet data network gateway and/or a configuration for the small cell RBS based on the received base station property information and to establish a wireless backhaul connection between the small cell RBS and the selected packet data network gateway using the selected configuration.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
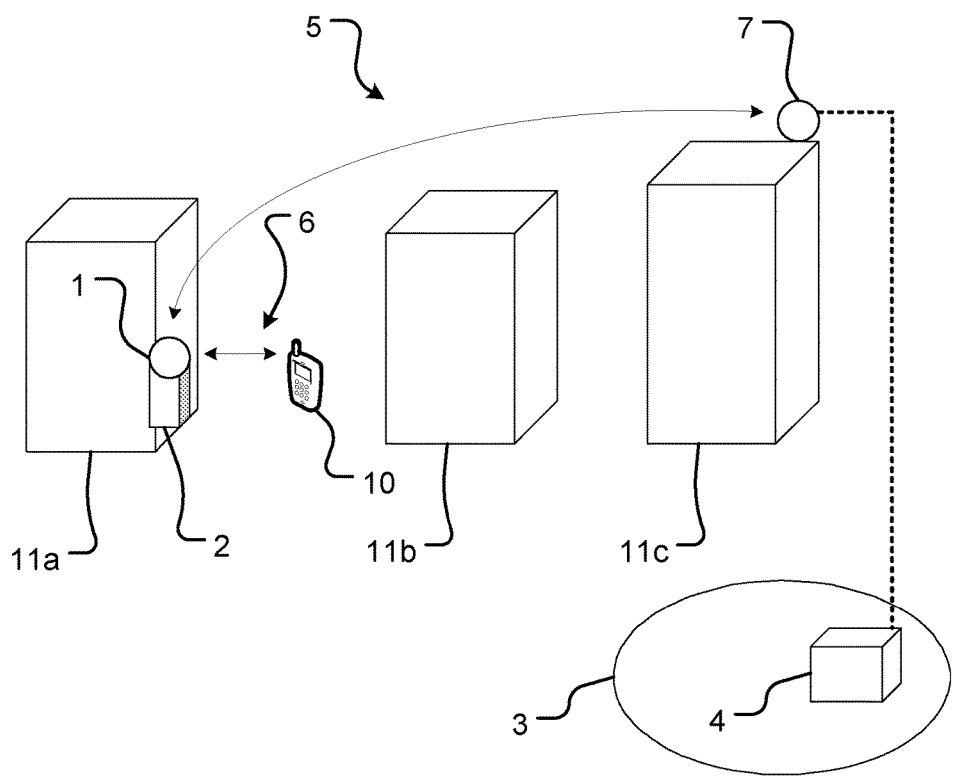
FIG. 1 shows a setup with a pRBS according to prior art.

Aspects of the present disclosure will be described more fully hereinafter with reference to the accompanying drawings. The devices and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As discussed in the background, FIG. 1 shows the setup of a small cell RBS according to prior art. A client 1 in the small cell RBS 2 communicates over an NLOS link 5 with a hub 7 which is connected with a wire to the Mobility Management Entity, MME, 4 of a core network 3. The small cell RBS is here located on a building 11a while the hub is located on another building 11c. The small cell RBS communicates with a user equipment, UE, 10 over a wireless link 6.

In this application an RBS is defined as a unit functioning as a transmitter and receiver of broadcasting or other signals, as in connection with a mobile phone, here referred to as a user equipment. Hence, several RBSs, typically using different Radio Access Technologies, RATs, such as e.g. 3GPP LTE or IEEE 802.11x may be located in the same physical unit. Then, there is also a need to be able to route the corresponding backhaul traffic to different packet data networks (PDNs). For example, the 3GPP LTE traffic needs to end up in S-GW or MME types of nodes and the WiFi traffic typically ends up in an edge router.

Thus, one or several additional connections are needed to carry the backhaul traffic to and from the small cell RBS.

In 3GPP EPS, there are several options for how the UE is allocated an IP address when a PDN connection and default EPS bearer is established:
1. /64 IPv6 prefix allocation via IPv6 stateless address auto-configuration;
2. IPv4 address allocation and IPv4 parameter configuration via DHCPv4;
3. IPv6 parameter configuration via stateless DHCPv6;
4. IPv4 and/or IPv6 address allocation via NAS signaling For the wireless backhaul, the above four methods can be applicable to allocate an IP address for the client and/or the small cell RBS.

In LTE Relay Node Self-Configuration by Péter Szilágyi, Henning Sanneck, Nokia Siemens Networks Research, a method to provide OAM connectivity for an LTE Relay Node (RN) is presented. In this solution, when the RN initially connects, the APN is used to select a proper PDN-GW that can provide connectivity to the OAM network for the RN node. Furthermore, this PDN-GW provides DHCP relay so that the RN gets an IP address from the OAM network instead of the EPS.

The proposed technique goes beyond this and suggests that one or several small cell RBS attached to a client could receive IP addresses and further it suggests how a base station property information that is specific for each small cell RBS can be applied in order to provide wireless backhauling for small cell radio base stations.

It is an object of the present disclosure to enable the use of an IP based connection, such as LTE, in the connection between the client 1 and a core network node 4. More specifically, the present disclosure relates e.g. to:
How to trigger the client 1 to establish a new backhaul connection when a small cell RBS 2 is taken into operation at a site?
How to know the location of the most suitable Mobile Backhaul Packet Gateway, MBH PDN-GW, for each backhaul connection?
How to provide an IP address for the small cell RBS via the client, in the case the small cell RBS is not configured with a static IP address?
How to forward downlink packets from the client to the small cell RBS?
How to map uplink packets into correct backhaul connection and bearer (in client)?
How to establish a proper set of backhaul bearers that suit the small cell RBS?

Figure 2:
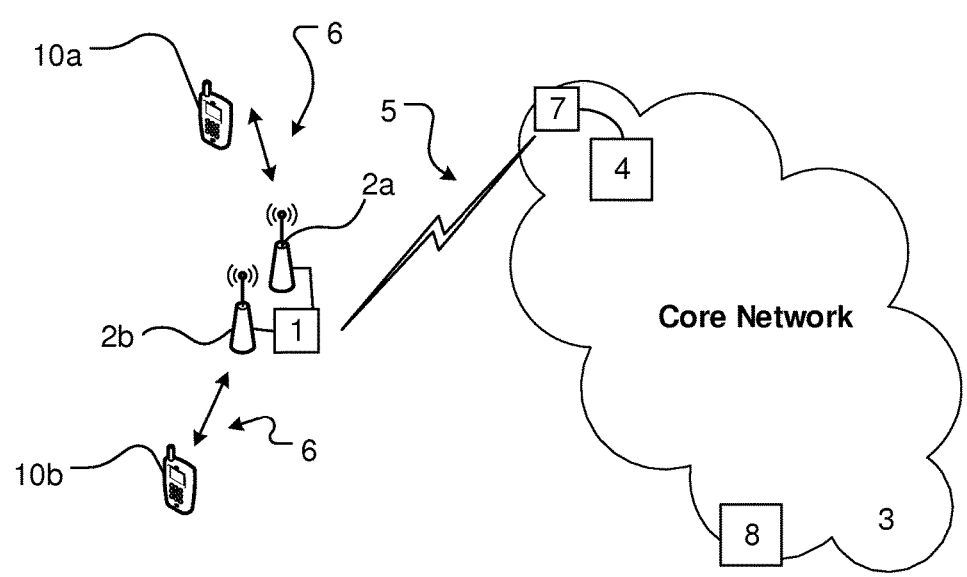
FIG. 2 shows the setup according to the present disclosure.

Therefore, as shown in FIG. 2, in this disclosure it is proposed to introduce a client 1, configured to wirelessly connect at least one small cell RBS 2a, 2b to a core network 3, which establishes one wireless backhaul connection between one small cell RBS and the core network. The method is i.e. performed when a small cell RBS is installed and powered on for the first time. By performing the method in the client, a convenient way to connect new small cell RBS to a core network is provided; the client will handle the setup of the backhaul connection. Furthermore, by using a client for establishing and maintaining the backhaul connection, there is no need to make changes in existing RBS technology for using IP based technology over the NLOS link.

Figure 3:
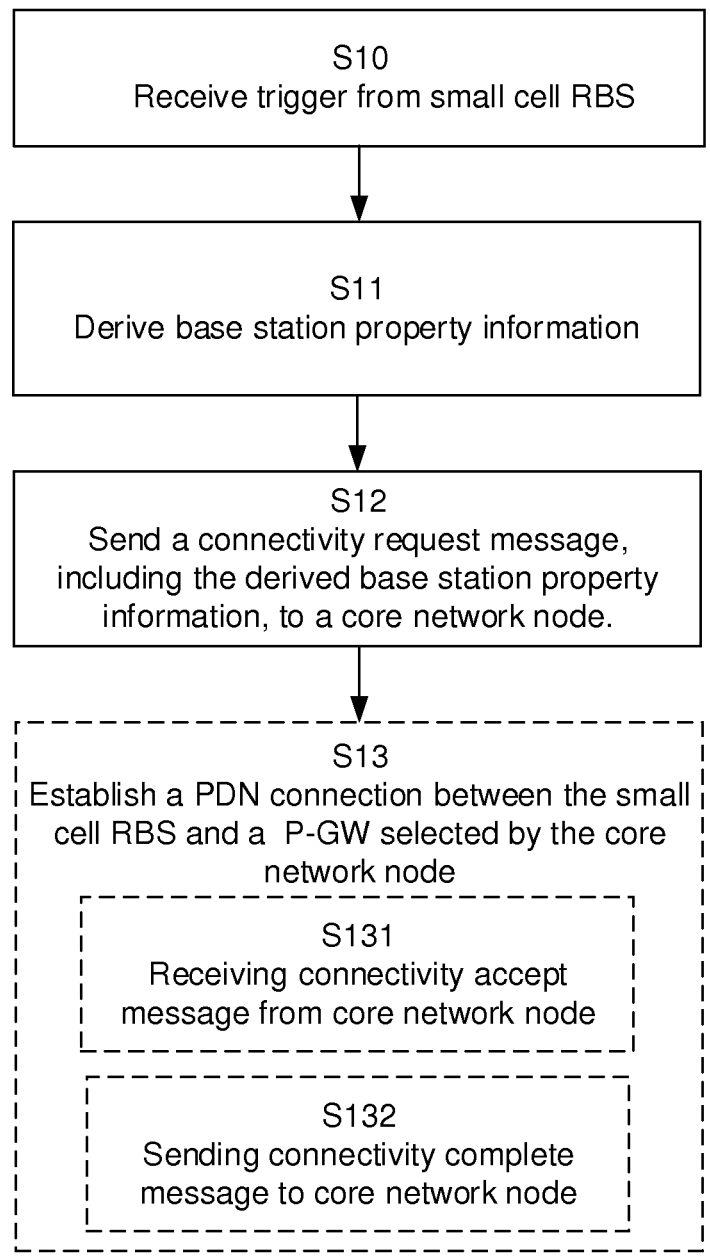
FIG. 3 illustrates the steps of the method performed in the client.

The method performed in the client will now be described referring to FIG. 3. The method is initiated when the client receives S10, from the small cell RBS, at least one message triggering the establishment of the wireless backhaul connection between the small cell RBS and the core network. The client then derives S11, from the at least one message, base station property information of the small cell RBS and sends S12, to a core network node, a connectivity request message, including the derived base station property information thereby enabling a selection of a packet data network gateway, PDN-GW, and/or a configuration for the small cell RBS in the establishment of the wireless backhaul connection.

According to one aspect of the present disclosure the configuration is one of: a bearer configuration, a protocol configuration or an IP layer configuration.

The client will then establish a wireless backhaul connection between the small cell RBS and a packet data network gateway selected by the core network node. This is done for example by the client receiving a connectivity accept message from the core network node and then sending a connectivity complete message to the core network node.

The client derives base station property information from the triggering message to ensure that the backhaul connection is effective. The disclosure provides a clear and straightforward way to trigger the establishment of a backhaul connection and provide IP address to the small cell RBS. The disclosure further provides a streamlined approach to the various parts of a backhaul connection establishment which is a fundamental part of small cell RBS integration.

The at least one message that triggers the establishment of the backhaul connection is according to one aspect more than one message. For example, in some cases one or several handshake messages are sent between the small cell RBS and the client before the client receives a DHCPDISCOVER or solicit message and the establishment of the backhaul connection is initiated. DHCPDISCOVER and Solicit message are discussed below.

Figure 4:
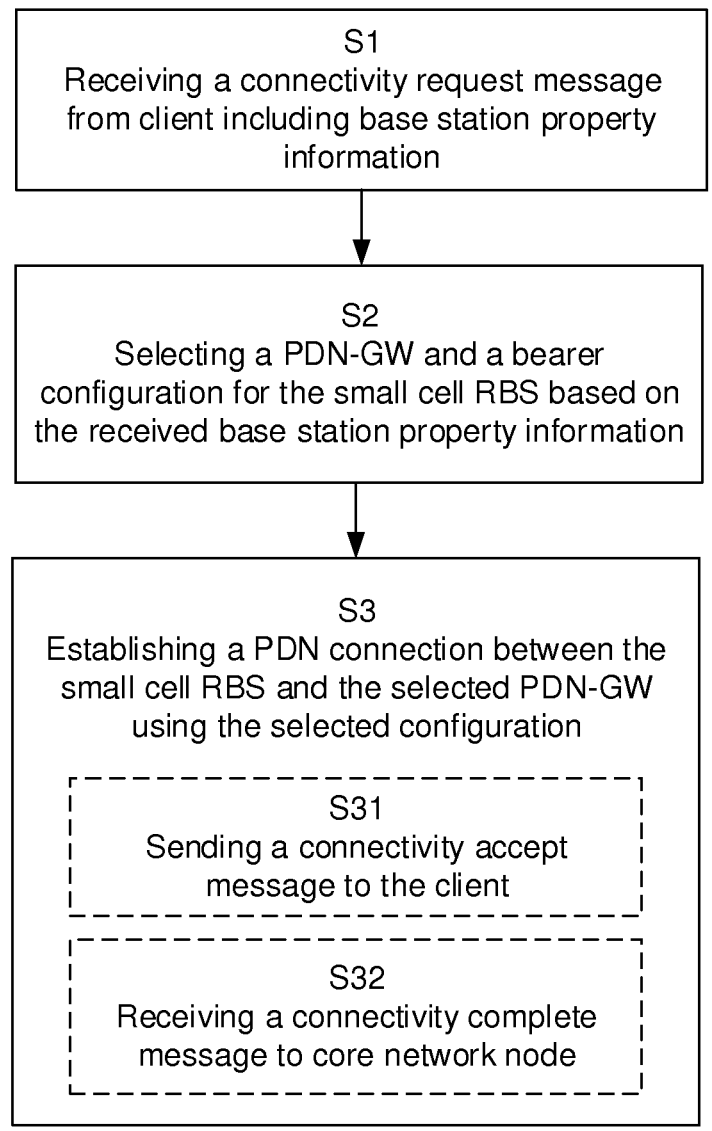
FIG. 4 illustrates the steps of the method performed in the core network node.

The corresponding method performed in the core network node will now be described referring to FIG. 4. The method is typically performed when a client has initiated the proposed method of establishing one wireless backhaul connection. The method comprises receiving S1 from a client, a connectivity request message including base station property information. As discussed above, the client has derived the property information from the small cell RBS. The core network node then selects S2 a packet data network gateway, PDN-GW, and/or a configuration for the small cell RBS based on the received base station property information. The core network node also establishes S3 a wireless backhaul connection between the small cell RBS and the selected packet data network gateway using the selected configuration. According to one aspect, the establishment of a wireless backhaul connection further comprises sending S31 a connectivity accept message to the client and receiving S32 a connectivity complete message.

Figure 5:
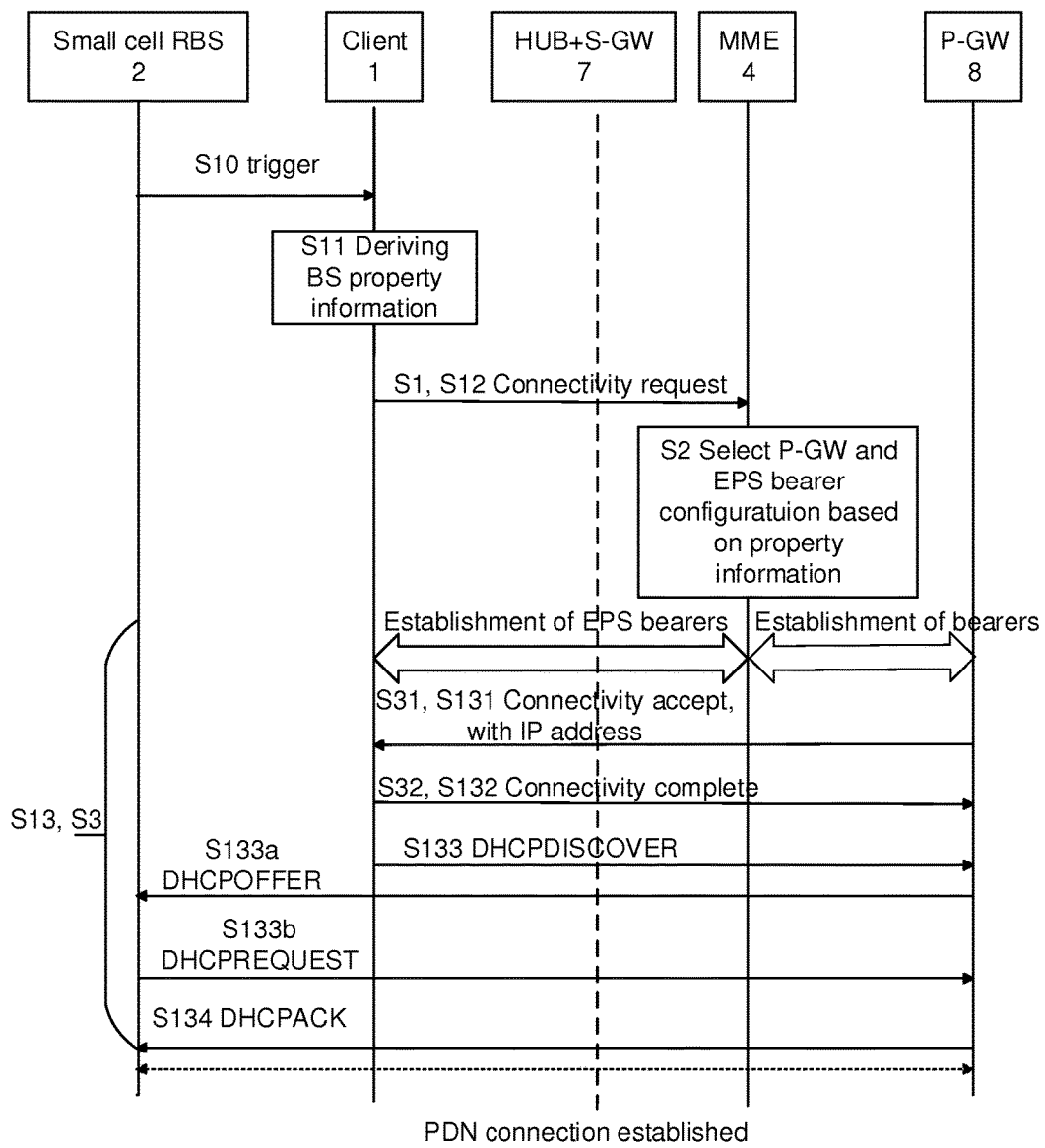
FIG. 5 is a signaling diagram according to one aspect of the disclosure.

The methods will now be described in more detail with four exemplary embodiments. See FIGS. 5 and 6 for signaling diagrams. When the backhaul connection is to be realized with an IP based technology, such as LTE, there are several alternatives to the messages content, depending on how the IP address allocation in the small cell RBS is performed and whether the small cell RBS uses IPv4 or IPv6. The alternatives are the following:

The small cell RBS uses IPv4 address configuration via DHCPv4
The small cell RBS uses IPv6 address allocation using DHCPv6
The small cell RBS uses static IPv4 address configuration
The small cell RBS uses stateless IPv6 address auto-configuration Example Embodiment 1: Small Cell RBS Uses IPv4 Address Configuration Via DHCPv4

In this example it is assumed here that the small cell RBS uses IPv4 and that the IPv4 address is allocated using DHCPv4. When a logical function, e.g. 3GPP LTE eNB, in the small cell RBS initiates it transfers a DHCPDISCOVER message S10 in order to request an IPv4 configuration for the interface used by the logical function. In other words, the message triggering the establishment of the wireless backhaul connection is a DHCPDISCOVER S10 DHCPv4 message.

The DHCPDISCOVER includes a parameter that can be used to derive S11 the base station property information. Different alternatives for this parameter are discussed below.
1. Triggered by the DHCPDISCOVER, the client derives S11 the base station property information.
2. The client then sends S1, S12 a connectivity request to the core network node via a hub 7, including the base station property information. According to one aspect the core network node is a Mobile Backhaul Mobility Management Entity, MBH MME 4. In the Protocol Configuration Options (PCO) field of the connectivity request message, the client indicates whether it would like to request an IP address, on behalf of the small cell RBS, separately using DHCP or be provided the IP address in the connectivity accept message.
3. Using the base station property information in the connectivity request, the core network node can select S2 and find a proper PDN-GW node, e.g. by using a Domain Name System, DNS, lookup with the base station property information as input.
4. In case the client indicated so in the PCO field of the connectivity request message, the IP address of the small cell RBS is assigned by the PDN-GW. According to one aspect, in this process the PDN-GW in turn requests the IP address from the Packet Data Network, PDN, corresponding to the base station property information provided by the client. According to one aspect, the PDN-GW itself assigns the IP address of the small cell RBS.
5. The core network node selects S2 a proper configuration for the small cell RBS, using the base station property information, and the subscription data for the client, as inputs. The bearer(s) are established between the client and the MBH PDN-GW.
6. The PDN-GW responds to the client, via the core network node, in the connectivity accept message S31, S131 and includes the IP address if it was assigned in step 4. In other words, the connectivity accept message comprises an IP address assigned to the small cell RBS. The client responds back to the core network node with a connectivity complete S32, S132 message.
7. If the client indicated in step 2 that it will not request IP address separately using DHCP, the client provides the assigned IP address to the small cell RBS that was sent in the connectivity accept in a DHCPOFFER message S133a. The small cell RBS accepts this IP address by sending a DHCPREQUEST message S133b, and the client responds with a DHCPACK message S134, ending the IP address allocation procedure.
8. If the client indicated in step 2 that it will request IP address separately using DHCP, the client now forwards the DHCPDISCOVER over one of the bearers, e.g. the default EPS bearer, established in step 5. This means that the client, from the small cell RBS point of view, acts as a DHCP relay.
9. The IP address of the small cell RBS is assigned by the MBH PDN-GW. In this process the MBH PDN-GW may in turn request the IP address from the PDN corresponding to the APN provided by the client.

Example Embodiment 2: The Small Cell RBS Uses IPv6 Address Allocation Using DHCPv6

This example is very similar to the case above; with the exception that DHCPv6 is used instead of DHCPv4.
1. When a logical function, e.g. 3GPP LTE eNB, in the small cell RBS starts up it transfers a Solicit message S10 in order to request an IPv6 configuration for the interface used by the logical function. According to one aspect, the message triggering the establishment of the wireless backhaul connection is a Solicit message. The Solicit message includes DHCP Unique Identifier (DUID) that is used to identify the small cell RBS, so the client and MBH PDN-GW later can select the proper base station property information and configuration for the small cell RBS. According to one aspect, the base station property information is derived from a DHCP Unique Identifier, DUID.
2. Triggered by the Solicit message, the client derives S11 the base station property information.

3. The Client then sends S1, S12 a connectivity request to the core network node including the base station property information that is derived from the Solicit message. In the Protocol Configuration Options (PCO) field of the connectivity request message, the client indicates whether it would like to request an IP address (on behalf of the small cell RBS in this case) separately using DHCP, or be provided by the IP address in the PDN connectivity accept message.

From this step the steps are in principle identical to steps 4 and onwards in the DHCPv4 case described above. In the DHCPv6 case the messages corresponding to the DHCPv4 messages DHCPOFFER, DHCPREQUEST and DHCPACK are Advertise, Request and Reply.

Example Embodiment 3: The Small Cell RBS Uses Static IPv4 Address Configuration

In case the small cell RBS uses a static IPv4 configuration, e.g. using a configuration file, the client receives S10 a first uplink packet from the small cell RBS which triggers the client to derive S11 the base station property information. Typical examples of the first uplink packet could be a DNS lookup request or an Address Resolution Protocol, ARP, request. By examining the destination address, source IP address or a combination of both of the packet, the client can derive the proper base station property information. An example on how to translate the IP address to base station property information is to use reverse DNS.

When the client has derived the base station property information, it requests the setup of a backhaul connection and proceeds according to step 2 and onwards in the DHCPv4 case described above.

Example Embodiment 4: The Small Cell RBS Uses Stateless IPv6 Address Auto-Configuration The IPv6 address is divided into two parts: The 64 bit network prefix and the 64 bit interface identifier. The 64 bit interface identifier is here configured statically by the small cell RBS, e.g. by basing it on the MAC address of the interface or by using a configuration file. The network prefix is typically assigned by a router by using the Neighbor Discovery Protocol (NDP).

When the client receives an NDP message requesting the network prefix, it will derive the base station property information based on the interface identifier included in the NDP message, and then proceed to setup the backhaul connection using the derived base station property information, according to steps 2 and onwards in the DHCPv4 example described above. There are two options for how the network prefix is assigned and controlled by the PCO setting:
1. The Network prefix is assigned using the NAS signaling
2. The Network prefix is assigned after the backhaul connection and bearers are established using NDP relay.
DHCPDISCOVER Message In the DHCPDISCOVER message for IPv4, there already exists an optional parameter: Vendor Class Identifier (VCI) (Option 60) which is a variable length string. According to one aspect of the disclosure, the base station property information is derived from the Vendor Class Identifier, VCI, in the DHCPDISCOVER message. According to one aspect, the VCI is an extension which is present in the DHCPDISCOVER message. This VCI parameter can be populated as follows in order to be used to derive the base station property information by the client:

1. First alternative is to include the APN itself. The APN is formatted according to 3GPP specifications. The APN needs therefore to be configured beforehand into the small cell RBS.
2. Second alternative is to indicate the type of equipment, e.g. a small cell RBS product identification. In this way the backhaul can properly not just select an APN suitable for the small cell RBS, but also setup the correct bearers with proper Quality of Service, QoS.

There is no need for any other specific connection messages when using a DHCP message to trigger the backhaul connection establishment. DHCP is also used for regular eNB so it is available and the specific option utilized is vendor specific. Thus an elegant solution to backhaul connection establishment is offered with no, or very minor, changes or additions required for the node.

According to one aspect, the base station property information is derived S11 from one or several, in any combination, of the following: a source and/or destination address in the message, wherein the message is an IP packet, Address Resolution Protocol, ARP, packet, an Internet Control Message Protocol, ICMP, packet and/or an interface identifier wherein the message is a Neighbor Discovery Protocol, NDP, message.

According to one aspect, the base station property information is derived S11 from a Client hardware address, with an IEEE MAC address. According to one aspect, the Client hardware address is present in the DHCPDISCOVER message.

There are several possibilities for the content of the base station property information. The information is such that the core network node 4 is enabled to setup a working configuration and choose a working PDN-GW 8. The base station property information comprises one or several, in any combination, of an Access Point Name, APN, an indication of the second radio access technology of the small cell RBS, i.e. the radio access technology between the small sell RBS and a UE and/or an identifier of type of RBS equipment of the small cell RBS.

An Access Point Name, APN, is the name of a gateway between a GPRS, 3G or 4G mobile networks and another computer network, frequently the public Internet. According to one aspect of the disclosure, the base station property information is the APN, the APN is then used to select a configuration, e.g. based on the radio access technology, RAT, assuming the APN indicates which RAT is used in the small cell RBS for this backhaul connection.

According to one aspect, the step of sending S12, in the method of the client 1, further comprises sending the connectivity request message over a first frequency band. The first frequency band being distinct from a second frequency band in which the small cell RBS communicates with wireless devices. In other words, the communication interfaces 11a and 11b communicates over different frequency bands.

According to one aspect, the step of sending S12 further comprises sending the connectivity request message over a first radio access technology, the first radio access technology being distinct from a second radio access technology over which the small cell RBS communicates with wireless devices. In other words, the client communicates with the core network over one radio access technology, the first, and the small cell RBS communicates with a UE over another, the second.

According to one aspect of the disclosure, the small cell RBS has one or several small cell RBS-communication interfaces for communication with UEs. For each interface it has typically one IP address. Each IP address represents one or several logical functions in the small cell RBS, where a logical function may be e.g. "3GPP LTE eNB", "WiFi AP" etc.

In the example where the first radio access technology is LTE the small cell RBS is a pico-evolved Node B, pico-eNB, and the packet data network gateway is a Evolved Packet Data Network Gateway, E-PDN-GW and the configuration is Evolved Packet System, EPS, bearer configuration.

By using 3GPP EPS based on LTE radio access technology for the backhaul connection, the concepts and solutions specified by 3GPP EPS are reused. The NLOS links are typically managed by an EPC (Evolved Packet Core). For example, the EPS Mobility Management Entity (MME) are needed for session control of the LTE NLOS backhaul links, and the Home Subscriber Server (HSS) is needed to store security and Quality of Service, QoS, characteristics of the links to individual UE embedded in the small cell RBS. On the other hand, not all features of a standard MME will likely be needed, e.g. parts of the mobility management will not be needed since the Clients are stationary.

LTE backhauling can be carried either over normal International Mobile Telecommunications, IMT, bands, e.g. on 2.4 GHz, in which case 3GPP standard LTE in-band or out-of-band relaying is used, or by running LTE baseband on higher radio frequencies, such as 28 GHz.

An alternative to using LTE as the first radio access technology is to use microwave backhaul technology. In case the NLOS link 6 is implemented using microwave backhaul technology, then the client and the hub will be typical to microwave backhaul technology solutions. The present disclosure is applicable to future microwave and/or mm-wave technologies.

Figure 6:
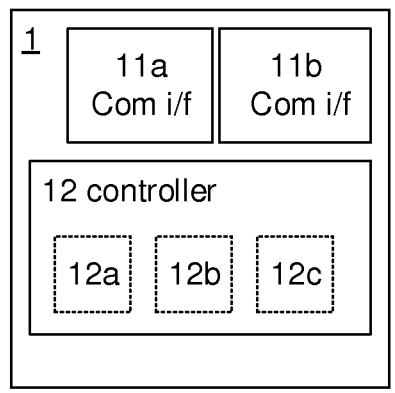
FIG. 6 is a block diagram schematically illustrating a client, for performing the method steps.

FIG. 6 shows a block diagram of a client 1. The client comprises two communication interfaces 11a, 11b, where one is for communication with the small cell RBS and the other for communication with the core network node.

According to one aspect of the disclosure, the client 1 is configured to wirelessly connect at least one small cell RBS to a core network. The client comprises a communication interface 11a, for communication with at least one small cell RBS, a radio communication interface 11b, for communication with a core network, and processing circuitry 12. The processing circuitry is configured to cause the client
to receive, using the communication interface 11a, from a small cell RBS, at least one message triggering the establishment of the wireless backhaul connection between the small cell RBS and the core network;
to derive, from the at least one message, base station property information of the small cell RBS; and
to send, using the radio communication interface 11b, a connectivity request message, including the derived base station property information, to a core network node, thereby enabling selection of packet data network gateway and/or a configuration for the small cell RBS.

According to a further aspect of the disclosure, processing circuitry 12 further comprises one or several of:
a receiver module 12a configured to receive, using the communication interface 11a, from a small cell RBS, at least one message triggering the establishment of the wireless backhaul connection between the small cell RBS and the core network;
a deriver module 12b configured to derive, from the at least one message, base station property information of the small cell RBS; and a sender module 12c configured, using the radio communication interface 11b, to send a connectivity request message, including the derived base station property information, to a core network node, thereby enabling selection of packet data network gateway and/or a configuration for the small cell RBS.

The receiver module 12a, the deriver module 12b and the sender module 12c are implemented in hardware or in software or in a combination thereof. The modules 12a, 12b, 12c are according to one aspect implemented as a computer program stored in a memory which run on the processing circuitry 12.

Figure 7:
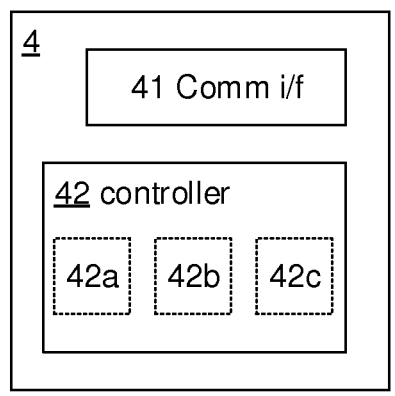
FIG. 7 is a block diagram schematically illustrating an MME, for performing the method steps of the core network node.

FIG. 7 shows a block diagram of a core network node 4. The core network node comprises a communication interface 41 for communication with the client.

According to one aspect, the disclosure relates to the core network node 4 configured to establish a wireless backhaul connection with a small cell RBS. The network node comprises a communication interface 41 configured for communication with the client 1 and processing circuitry 42. The processing circuitry is configured to cause the core network node:
to receive from a client, using the communication interface, a connectivity request message including base station property information derived in the client from the small cell RBS,
to select a packet data network gateway and/or a configuration for the small cell RBS based on the received base station property information and
to establish a wireless backhaul connection between the small cell RBS and the selected packet data network gateway using the selected configuration.

According to a further aspect of the disclosure, processing circuitry 42 further comprises one or several of:
a receiver module 42a configured to receive from a client, using the communication interface, a connectivity request message including base station property information derived in the client from the small cell RBS,
a selector configured 42b to select a packet data network gateway and/or a configuration for the small cell RBS based on the received base station property information and
an establishment module 42c configured to establish a wireless backhaul connection between the small cell RBS and the selected packet data network gateway using the selected configuration.

The receiver module 42a, the selector 42b and the establishment module 42c are implemented in hardware or in software or in a combination thereof. The modules 42a, 42b, 42c are according to one aspect implemented as a computer program stored in a memory which run on the processing circuitry 42.

An advantage with the above described setup is that in case the client needs to connect to the backhaul network via some other core network node, it will not change the addressing scheme of the small cell RBS attached to the network through this client.

In some examples, each small cell RBS is equipped with its own Client. According to another aspect of the disclosure, more than one small cell RBS will connect to the same core network node. Then, Radio Resource Management functions such as scheduling and prioritization of the traffic to and from the different clients are needed.

The backhaul connection is according to one aspect of the disclosure a Packet Data Network, PDN, connection. It is in this context defined as an association between a client, represented by an IP address, and a packet data network, represented by an APN. In the EPC controlling the NLOS backhaul, for each PDN, there is typically a need for a dedicated PDN Gateway (PDN-GW) for interfacing the PDN. So, if the client needs two simultaneous PDN connections, these PDN connections traverse different PDN-GWs.

In the EPS, when a PDN connection is to be established, the UE identifies the PDN to setup the connection by supplying an APN in the PDN connectivity request message transmitted from the UE over the ESM (EPS Session Management) protocol. See also 3GPP TS 23.401 Version 5.10.2. In this example, when the NLOS backhaul is implemented by the LTE-based EPS, all the actions taken by the "UE" are performed by the client, including terminating the ESM protocol.

Typically, the client needs several PDN connections. One PDN connection and associated EPS bearer(s) is typically used to carry messages between client and the hub and/or the client's Operation (Administration) and Maintenance, OAM, system.

To route downlink packets to the correct logical function in the small cell RBS, "L2 switching" combined with IP routing is performed by the client. To map uplink packets onto correct combination of PDN connection and EPS bearer, the client uses at least the originating interface, and IP address of the packet.

The invention claimed is:

1. A method, performed in a client configured to wirelessly connect at least one small cell radio base station to a core network, of establishing one wireless backhaul connection between one small cell radio base station and the core network, the method comprising the steps of, for the small cell radio base station:
   receiving at the client, from the small cell radio base station, at least one message triggering the establishment of the wireless backhaul connection between the small cell radio base station and the core network;
   deriving at the client, from the at least one message, base station identification information of the small cell radio base station; and
   sending from the client, to a core network node via a wireless connection, a connectivity request message, including the derived base station identification information thereby enabling a selection of a packet data network gateway and/or a configuration for the small cell radio base station in the establishment of the wireless backhaul connection.

2. The method according to claim 1, wherein the sending comprises sending the connectivity request message over a first frequency band, the first frequency band being distinct from a second frequency band in which the small cell radio base station communicates with wireless devices.

3. The method according to claim 1, wherein the sending comprises sending the connectivity request message over a first radio access technology, the first radio access technology being distinct from a second radio access technology over which the small cell radio base station communicates with wireless devices.

4. The method according to claim 1, wherein the message triggering the establishment of the wireless backhaul connection is a DHCPDISCOVER Dynamic Host Configuration Protocol version 4, DHCPv4, message.

5. The method according to claim 4, wherein the base station identification information is derived from the Vendor Class Identifier, VCI.

6. The method according to claim 1, wherein the message triggering the establishment of the wireless backhaul connection is a Solicit Dynamic Host Configuration Protocol version 6, DHCPv6, message.

7. The method according to claim 6, wherein the base station identification information is derived from a DHCP Unique Identifier, DUID.

8. The method according to claim 1 further comprising:
   establishing via the client a wireless backhaul connection between the small cell radio base station and a packet data network gateway selected by the core network node.

9. The method according to claim 8, wherein the step of establishing a wireless backhaul connection comprises:
   receiving at the client a connectivity accept message from the core network node.

10. The method according to claim 9, wherein the step of establishing a wireless backhaul connection further comprises:
    sending from the client a connectivity complete message to the core network node.

11. The method according to claim 9, wherein the connectivity accept message comprises an Internet Protocol, IP, address assigned to the small cell radio base station, and wherein the method further comprises:
    providing from the client the assigned IP address to the small cell radio base station.

12. The method according to claim 1, wherein the base station identification information is derived from a destination address in the message, wherein the message is an IP, Address Resolution Protocol, ARP, or an Internet Control Message Protocol, ICMP, packet.

13. The method according to claim 1, wherein the base station identification information is derived from a source address in the message, wherein the message is an IP, Address Resolution Protocol, ARP, or an Internet Control Message Protocol, ICMP, packet.

14. The method according to claim 1, wherein the base station identification information is derived from an interface identifier, and wherein the message is a Neighbor Discovery Protocol, NDP, message.

15. The method according to claim 1, wherein the base station identification information comprises an Access Point Name, APN.

16. The method according to claim 1, wherein the base station identification information indicates the radio access technology of the small cell radio base station.

17. The method according to claim 1, wherein the base station identification information identifies a type of radio base station equipment of the small cell radio base station.

18. The method according to claim 1, wherein the small cell radio base station is a pico-evolved Node B, pico-eNB, wherein the packet data network gateway is a Evolved Packet Data Network Gateway, E-PDN-GW and wherein the configuration is Evolved Packet System, EPS, bearer configuration.

19. A method, performed in a core network node, of establishing a wireless backhaul connection with a small cell radio base station, the method comprising the steps of:
    receiving at the core network node a connectivity request message from a client via a wireless connection, the connectivity request message including base station identification information, wherein the client has derived the property information from the small cell radio base station,
    selecting at the core network node a packet data network gateway and/or a configuration for the small cell radio base station based on the received base station identification information, and establishing via the core network node a wireless backhaul connection between the small cell radio base station and the selected packet data network gateway using the selected configuration.

20. The method according to claim 19, wherein the step of establishing a wireless backhaul connection further comprises:
sending from the core network node a connectivity accept message to the client.

21. The method according to claim 20, wherein the connectivity accept message comprises an IP address.

22. A client, configured to wirelessly connect at least one small cell radio base station to a core network, the client comprising:
a communication interface for communication between the client and at least one small cell radio base station;
a radio communication interface for communication between the client and a core network; and
processing circuitry configured to cause the client:
to receive at the client, using the communication interface, from a small cell radio base station, a message triggering the establishment of the wireless backhaul connection between the small cell radio base station and the core network;
to derive at the client, from the at least one message, base station identification information of the small cell radio base station; and
to send from the client, using the radio communication interface, a connectivity request message, including the derived base station identification information, to a core network node, thereby enabling selection of packet data network gateway and/or a configuration for the small cell radio base station.

23. A core network node configured to establishing a wireless backhaul connection with a small cell radio base station, the network node comprising:
a communication interface configured for communication between the core network node and a client configured to wirelessly connect at least one small cell radio base station to a core network;
processing circuitry configured to cause the core network node:
to receive from a client, using the communication interface of the core network node, a connectivity request message including base station identification information derived in the client from the small cell radio base station,
to select at the core network node a packet data network gateway and/or a configuration for the small cell radio base station based on the received base station identification information and
to establish via the core network node a wireless backhaul connection between the small cell radio base station and the selected packet data network gateway using the selected configuration.

* * * * *